Figure 1:
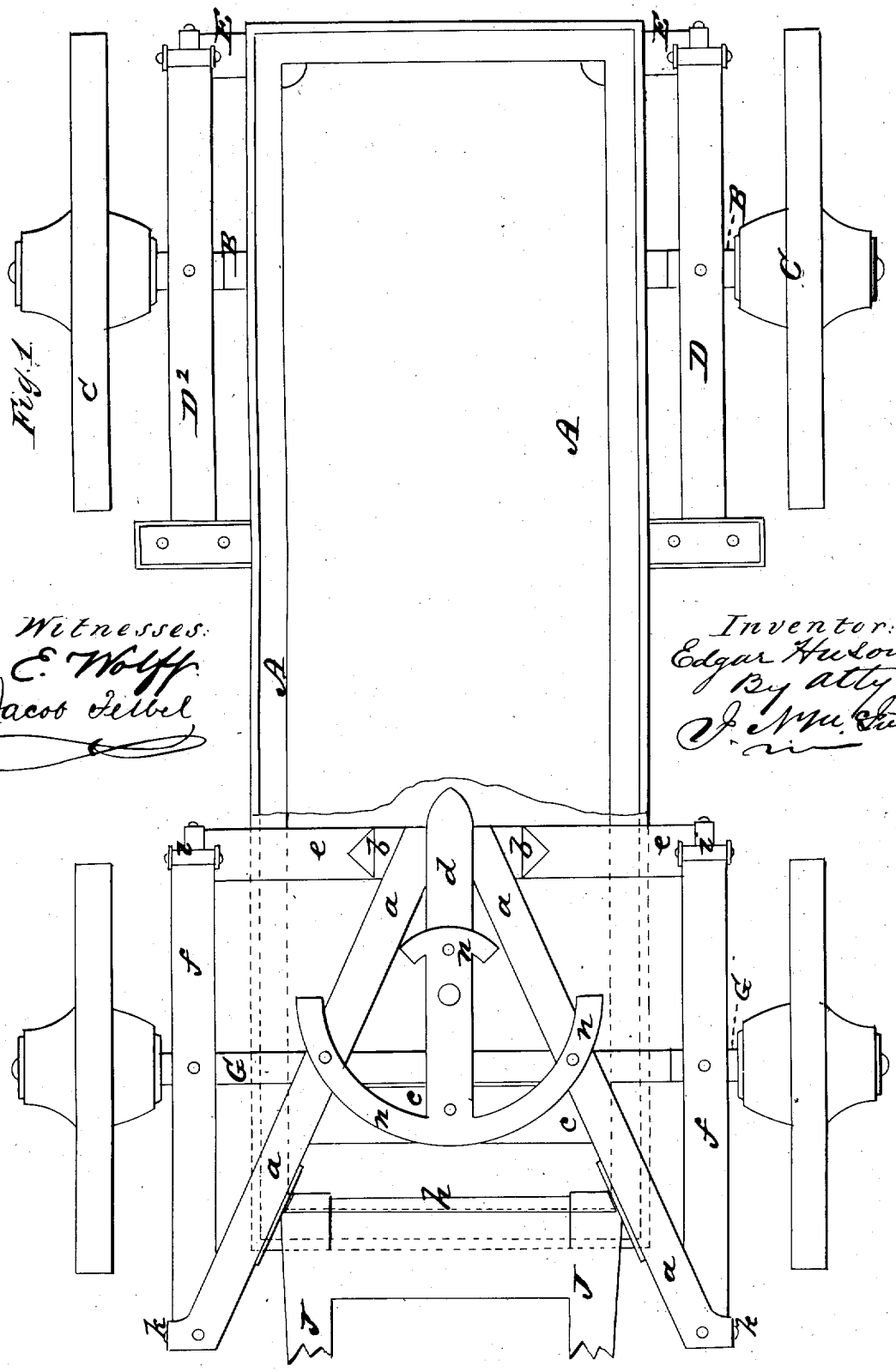

2 Sheets--Sheet 1.

E. HUSON.

Wagon.

No. 6,660. Reissued Sept. 28, 1875.

Witnesses:
E. Wolff
Jacob Seibel

Inventor:
Edgar Huson
By atty.
J. Mc. Intire

2 Sheets--Sheet 2.

E. HUSON.

Wagon.

No. 6,660.

Reissued Sept. 28, 1875.

Witnesses:
E. Wolff
Jacob Fellel

Inventor:
Edgar Huson
By atty
E. J. McIntire

UNITED STATES PATENT OFFICE

EDGAR HUSON, OF ITHACA, N. Y., ASSIGNOR, BY MESNE ASSIGNMENTS, TO ELIZA G. HALSEY.

IMPROVEMENT IN WAGONS.

Specification forming part of Letters Patent No. 16,648, dated February 17, 1857; reissue No. 2,500, dated March 5, 1867; extended seven years; reissue No. 6,660, dated September 28, 1875; application filed August 30, 1875.

*To all whom it may concern:*

Be it known that I, EDGAR HUSON, of Ithaca, Tompkins county, State of New York, have invented an Improved Platform-Wagon Gearing; and I do hereby declare the following to be a full, clear, and exact description thereof, reference being had to the accompanying drawings, and to the letters of reference marked thereon.

My invention relates to certain improvements in the construction of the forward portion of the running-gear of that kind of wagons in which said forward portion of the running-gear embraces a frame-work or platform, and three springs arranged immediately to the forward axle of the wagon and the wagon-body.

Previous to my invention it has been customary, in the construction of platform-wagon gearing, to employ a sort of rectangular frame or frame-work, so made and arranged over the front set of springs that its forward and rear bars would be supported respectively by the front ends of the two side springs and by the middle (highest point) or crown of the third spring, and so that its two side bars, which run about parallel with the side springs, would receive support through the medium of their union (at each end) with the said front and rear bars. Such frame-work was suitably braced with a cross bar or bars to afford the proper bearing-supports for the fifth-wheel of the wagon, and it was customary in this construction of wagon-gearing to have the draft pole or thills attached in some suitable manner to the forward portion of the frame just alluded to, either by means of connections made directly with the front bar or with some other forward part of the frame-work. But in a wagon having its running-gear constructed upon this principle certain objections exist, prominent among which may be mentioned a liability of interference between the side bars of the frame and the side springs, by which the latter are deprived of their full efficiency; the placement of the point of draft or point of attachment of the draft-pole so far forward as to render the draft harder and the management of the wagon in turning difficult; the liability of an interference of the front bar of the frame-work with the team or its trappings; and a weight and clumsiness of structure disproportionate to its strength and durability.

I propose by my improvements to overcome most or all of the objectionable features of the heretofore-employed construction of platform-wagon running-gear, and to provide for use a strong, light, and, at the same time, more efficient and durable structure than any which has, to my knowledge, been before known or used.

To these ends and objects my invention consists in a platform-wagon gear in which the frame or frame-work, that is supported by and over the three forward springs, and that in turn supports the forward end of the wagon, is made without the usual front bar, and with its side bars arranged nearer together at their rear than at their forward ends, all as will be hereinafter more fully explained.

To enable those skilled in the art to more fully comprehend and practice my invention, I will proceed to describe the construction and operation of a wagon embracing my improvements, referring by letters to the accompanying drawings, in which—

Figure 2:
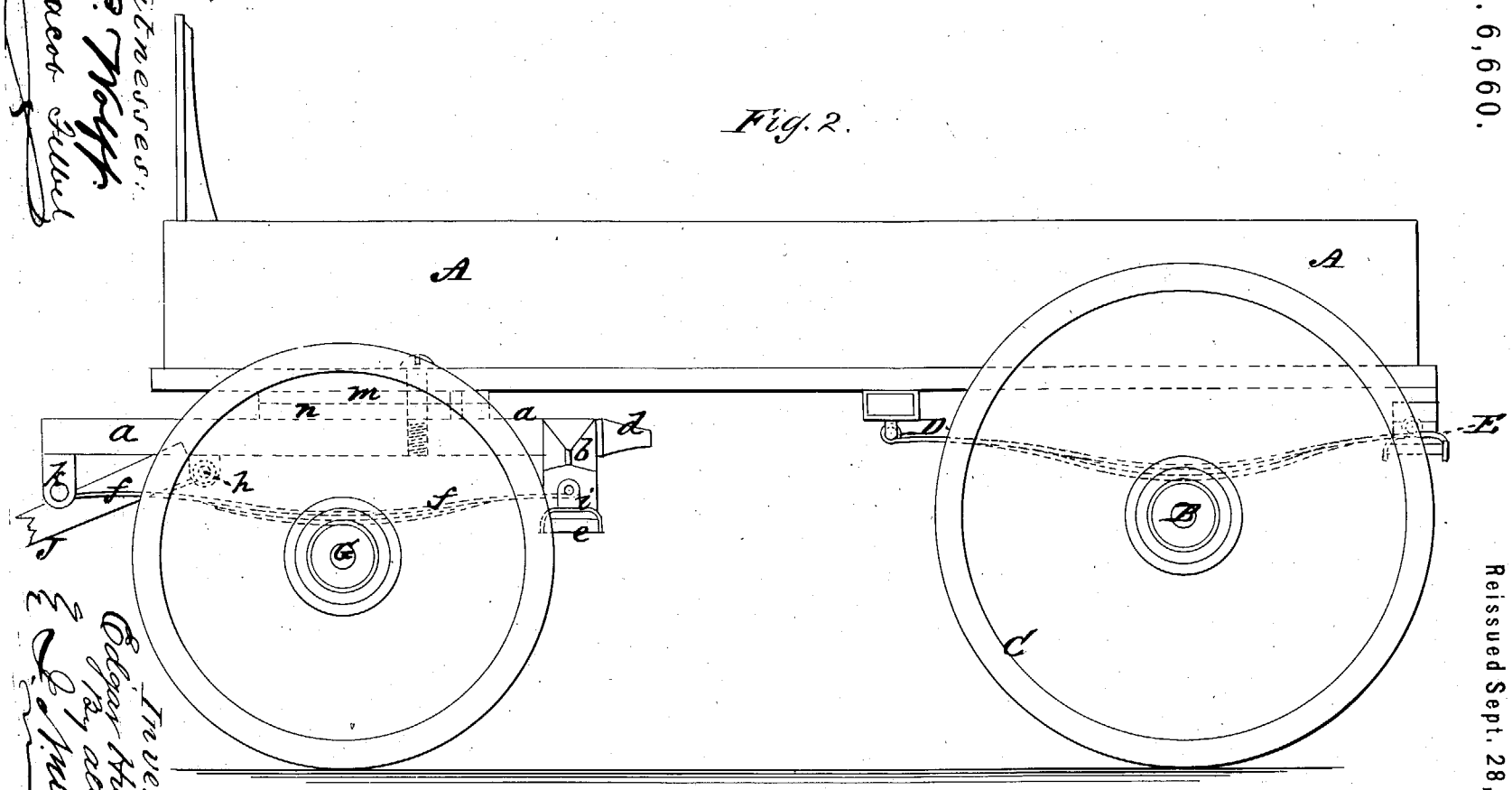

Figure 1 is a top view, and Fig. 2 a side elevation, of such a wagon.

In Fig. 1 the forward portion of the body or box of the wagon is illustrated as if broken away for the purpose of clearer illustration of the parts beneath, and in the several figures the same part will be found designated by the same letter of reference.

A is the body of an ordinary box-wagon, the rear end of which is supported over the hind axle B and between the wheels C C, in the usual manner, upon three springs, D, $D^2$, and E, the former two, D $D^2$, being arranged about parallel with the sides of the body A, and the last-named, E, at right angles therewith.

The construction of this rear portion of the running-gear, and its arrangement with the body A, will be clearly understood by observation of the drawings, and, as it does not embrace anything novel, need not be further alluded to.

The forward end of the box A is supported over and upon a platform spring-gear, which embraces the features of novelty made the subject of my application, and the construction and operation of this part of the vehicle I will now minutely explain.

Over the front axle-tree G are arranged, in about the usual manner, two side springs, *f f*. These springs are of course securely fastened at their centers to the axle-tree, and from their rear ends depend two stirrups or straps, *i i*, to which are secured the ends of the transverse or cross spring *e*.

On the upper middle portion or crown of the transverse spring *e*, which portion is about on a level with the ends of the side springs *f f*, is securely fastened a head-piece or bar, *b*, to which are firmly secured the rear ends of the two bars *a a*, that extend from said head-piece forward divergently to the front ends of the springs *f f*, where they are secured to said springs by metal straps and rivets or shoe-pieces, as seen at *k k*. To the said head-piece *b* is also securely united the rear end of a center brace or bar, *d*, which extends thence forward to the cross beam or bar *c*, to which it is fastened, and which in turn is secured at each end to the two side bars *a a*.

It will be understood that the several bars *a a*, *c*, and *d* are located in about the same plane, and together with the head-piece *b* constitute a sort of A-shaped frame or frame-work, supported at its apex (so to speak) on the middle of the transverse spring *e*, and at its base on the front ends of the two side springs *f f;* and it will be seen that this A-shaped frame-work or platform constitutes the resting place or support for the body A of the wagon.

The wagon is provided, as usual, with metallic bearing-pieces, arranged concentrically to the king-bolt, the lower one of which is fastened on top of the frame, as seen at *n*, and the upper one to the bottom of the body A, as seen at *m*, the two together forming what is generally designated as the fifth-wheel. J represents the thills or shafts of the wagon, which are attached at their rear ends to the bars *a a* by the rod *h*, or by any other usual or convenient mode of coupling.

It will be observed that the points or line of attachment of the thills (or pole, if one be used) to the wagon is located considerably back of, or in rear of, the front ends of the side springs *f f*, and of the forward extremities of the frame-work which rests on the three springs; and it will also be seen that this arrangement of the line of attachment of the draft device back of the points mentioned, and much farther back than would be possible in a wagon made in the old-fashioned way, is rendered possible only by the construction of the frame-work without the usual front bar extending across from one to the other of the forward extremities of the side bars *a a*.

By the method of construction described I am enabled to hitch the team so much closer to the wagon than usual as to not only lessen the draft, but make it possible to turn round in a smaller space.

The formation of the frame-work after the fashion or shape of the letter A, as shown and mentioned, renders said frame stronger and more efficient with a given weight of stock than a frame made in the usual shape, since the said frame is more compact and more closely braced when the main bars *a a* run more directly from the two widely-separated points of support at their forward ends toward the one central rear point of support on spring *e;* and it will be understood that in a frame constructed upon this principle of narrowing at the rear portion, where it derives its support from the middle point of the transverse spring, and connecting the bars *a a* together by a brace or cross-beam, arranged some distance in rear of the forward extremities of said bars, not only is the opportunity afforded for the placement of the draft device farther back than usual, as clearly explained, but the cross-brace *c* is made shorter, and consequently lighter, and also stiffer or stronger, than it can be when placed as heretofore at the forward ends of bars *a a*.

The advantages of a frame-work made and arranged as described result principally from these novel peculiarities, viz., that its formation is such as to nearly conform to the outline of a figure which just embraces the three points of support for the frame, while at the same time its forward portion can straddle, more or less, the draft device, and its parts securely brace each other and so combine as to afford a proper support round about the pivotal point of attachment of the body of the wagon to the said frame-work.

The precise shape and size of the parts of the contrivance may, of course, be varied without departing from the peculiarities of construction in which I have described my invention as really consisting.

Having so fully explained my improved wagon that any skilled person can make and use one, what I claim therein as new, and desire to secure by Letters Patent, is—

1. In combination with the two side springs and one transverse or cross-spring, a frame or frame-work, for supporting the wagon-body, the side bars or beams of which extend from points near the front ends of the side springs convergently toward the crown or middle of the transverse spring, and which is supported on said springs, substantially as described.

2. In combination with the supporting rear cross-spring *e* and the side springs *f f*, a frame-work for supporting the forward end of the wagon-body, made, substantially as described, to permit the attachment of the draft device back of the front ends of said frame-work and forward extremities of said side springs.

In testimony whereof I have hereunto set my hand and seal this 11th day of August, 1875.

EDGAR HUSON. [L. S.]

In presence of—

BENJ. G. FERRIS,
WM. HALSEY.